United States Patent [19]

Hertzenberg et al.

[11] 4,117,105

[45] Sep. 26, 1978

[54] PROCESS FOR PREPARING DISPERSIBLE BOEHMITE ALUMINA

[75] Inventors: Elliot P. Hertzenberg, Wilmington, Del.; Irwin Jerry Itzkovitch, Willowdale; Ivan H. Joyce, Oakville, both of Canada

[73] Assignee: PQ Corporation, Valley Forge, Pa.

[21] Appl. No.: 779,441

[22] Filed: Mar. 21, 1977

[51] Int. Cl.$^2$ ............................. C01F 7/02; C01F 7/44
[52] U.S. Cl. ................................. 423/625; 423/628; 252/313 R
[58] Field of Search .............................. 423/625, 628; 252/313 R

[56] References Cited

U.S. PATENT DOCUMENTS

| | | | |
|---|---|---|---|
| 3,222,129 | 12/1965 | Osment et al. | 423/628 |
| 3,223,483 | 12/1965 | Osment | 423/628 |
| 3,226,191 | 12/1965 | Osment et al. | 423/628 |
| 3,608,060 | 9/1971 | Osment et al. | 423/628 |

*Primary Examiner*—Herbert T. Carter
*Attorney, Agent, or Firm*—Ernest G. Posner; Fred C. Philpitt; J. S. Stephen Bobb

[57] ABSTRACT

A process for the preparation of finely divided dispersible alpha-alumina monohydrate (boehmite) from alumina trihydrate is disclosed. The alumina trihydrate is calcined thereby increasing the surface area through a partial dehydration. The calcined intermediate is slurried in water and autoclaved to achieve crystallization and rehydration. Conventional drying methods are used to obtain the particles. The particle size of the product is much smaller than that of the starting raw material.

8 Claims, No Drawings

PROCESS FOR PREPARING DISPERSIBLE BOEHMITE ALUMINA

BACKGROUND

This invention relates to the preparation of colloidal particles of alumina. In particular, the invention is a process for converting alumina trihydrate to boehmite alumina that can be readily formed into aqueous dispersions.

Numerous methods have been advanced for the preparation of oxides of alumina in colloidal or sol form. A number of these methods are summarized in U.S. Pat. Nos. 2,590,833; 2,787,522; 2,915,475; 3,357,791 and 3,966,893. These methods require the hydrolysis and hydrothermal treatment of soluble aluminum salts to produce the desired alumina. U.S. Pat. No. 2,590,833 is typical and teaches a process for preparing alumina hydrate sols. An aqueous solution of an aluminum salt is poured into an aqueous solution of a base; the proportions of the reactants are adjusted so that the pH is about 7 to 9.5. The precipitate formed is filtered and washed to remove over 95% of the anion contributed by the aluminum salt. The washed, reslurried precipitate is peptized by heating to form a suspension which is colloid milled to provide the alumina hydrate sol containing 4 to 5% solids.

These processes have several disadvantages. They require relatively expensive water soluble aluminum salts as raw materials. They generate large volumes of relatively dilute solution of various salts which require much effort and cost to discard and/or reclaim. In addition, the intermediate precipitates require extensive washing to remove various inorganic or organic species. Such washing often leads to loss or alteration of the fine particulate matter.

SUMMARY OF THE INVENTION

We have invented a method for the preparation of dispersible, colloidal sized particles of boehmite alumina (alpha-alumina monohydrate) that does not involve hydrolysis of a water soluble aluminum salt or require extensive washing to remove unwanted impurities. The method of this invention comprises the steps of:

(a) calcination of alumina trihydrate such as gibbsite thereby effecting an increase in the surface area by a partial dehydration;

(b) forming a slurry of the calcined alumina trihydrate and water;

(c) autoclaving the slurry thereby achieving the crystallization and rehydration of the alumina; and (d) dewatering the aqueous slurry by conventional means such as spray drying or tray drying.

The process uses insoluble and relatively inexpensive alumina trihydrate as the only raw material and no other ions are present to necessitate washing to remove impurities.

The product consists of essentially pure well crystallized particles of boehmite alumina which is also known as alpha-alumina monohydrate. The particles are well within the colloidal size range and can be dispersed in water that contains small amounts of acid. Organic dispersing agents are also effective in producing stable dispersions.

THE INVENTION

The raw material required for our process of producing fine particle boehmite can be any form of hydrated alumina that when dehydrated at temperatures above about 200° C form substantially amorphous, partially dehydrated alumina or poorly crystallized chi-alumina. The surface area of the alumina must increase upon dehydration to form the product particles desired.

The various forms of alumina trihydrate are excellent sources of alumina for this process. We prefer to use gibbsite, the alpha form of alumina trihydrate. The physical size of the alumina trihydrate appears to be very important in preparing dispersible particles of boehmite. Although the process of our invention results in a significant reduction in the particle size of the product when compared to that of the raw material, the particles of the initial reactant such as gibbsite should be relatively small. We have found that gibbsite with an average particle diameter of 0.5 to 10 microns is useful in producing colloidal sized product particles. We prefer particles of gibbsite to be 8 microns or smaller and the most preferred range is 0.5 to 2 microns.

The hydrated alumina raw material is calcined at temperatures above 200° C, but below 850° C. We prefer to heat the material at about 200° to 450° C for 2 to 17 hours to effect the calcination properly. It is not necessary to produce an anhydrous material as a result of the calcination, but sufficient water must be removed to cause the formation of craters and fissures, thereby increasing the surface area of the intermediate material. We have found that if the surface area of the alumina trihydrate raw material gibbsite can be increased from between about 0.2 $m^2/g$ and 15 $m^2/g$ to between about 250 and 800 $m^2/g$ by the calcination, the desired final product can be readily produced by the subsequent processing steps.

The surface areas of these intermediate particles can be increased somewhat if required by air milling. The particles are entrained in opposing gas streams, thereby causing collisions involving the particles and promoting fractures and other mechanical changes in the particle surfaces leading to increased surface area.

The second step of the process involves hydrothermal treatment of the calcined intermediate. This step results in the crystallization and rehydration of the alumina. The largely amorphous partially dehydrated alumina trihydrate is transformed to a well crystallized alpha alumina monohydrate. This step of the process is carried out by preparing a slurry of the alumina intermediate in water and charging the slurry to an autoclave and heating it under autogeneous pressure at a temperature of 140° to 200° C for a period of one-half hour or more. In general, this step requires a heating period of one-half to 6 hours.

The discharge from the autoclave is an aqueous slurry of finely divided boehmite crystal particles. A stabilizing agent such as an acid can be added to this slurry and a stable dispersion of up to 25% $Al_2O_3$ produced. The aqueous slurry can also be dewatered by conventional methods of drying such as spray drying, tray drying or rotary drying.

The X-ray analysis of the dried product shows that the particles are essentially alumina monohydrate of the boehmite structure. The particle size is in the range of 50 to 10,000 Å. The surface area of the product is 35 to 250 $m^2/g$. The dewatered particles can be dispersed in water that contains less than 0.5%, but not less than 0.01% of an acid such as HCl at a boehmite solids content of 25%.

The alumina product can be used for any purpose requiring finely divided alumina such as catalyst supports. The dispersions can be used to provide anti-slip treatments for paperboard boxes.

EXAMPLES

The following Examples illustrate certain embodiments of the process of our invention and are not limiting to the scope of the invention. The scope of the invention is fully defined in the claims.

EXAMPLE 1

This Example illustrates the transformation of gibbsite (alpha-alumina trihydrate) to dispersible boehmite alumina by the process of this invention. The properties of the gibbsite were as follows: loss on ignition 24.9%; surface area 0.3 m$^2$/g; and phases by X-ray diffraction alpha-alumina trihydrate. Samples of gibbsite were placed in an oven and heated to various temperatures for various periods of time. Several samples were placed in the cold oven and heated gradually to temperature (gradual) while others were heated quickly in a preheated oven (instant). The calcined alumina was then blended with sufficient water to provide a fluid material and charged to an agitated autoclave. The autoclave was then heated to 160° C for 5 hours to convert the intermediate product to dispersible boehmite. Table I summarizes the conditions of calcination and the nature of the product realized from the autoclave step.

These results demonstrate that the calcination of the alumina trihydrate should be carried out at 200° C or higher to provide the desired boehmite structure.

TABLE I

PHASE REALIZED ON CALCINATION OF GIBBSITE AND SUBSEQUENT AUTOCLAVE TREATMENT AT 160° C FOR 5 HOURS

| Calcination Temp. (° C) | Time to Temperature | Time at Temp. (hours) | Product Realized From Autoclave |
|---|---|---|---|
| 150 | Gradual | 2 | Gibbsite |
| 150 | Gradual | 17 | Gibbsite |
| 200 | Instant | 17 | Gibbsite & Boehmite |
| 200 | Gradual | 17 | Boehmite |
| 250 | Instant | 2 | Boehmite |
| 250 | Instant | 17 | Boehmite |
| 300 | Instant | 2 | Boehmite |
| 300 | Instant | 17 | Boehmite |
| 400 | Instant | 2 | Boehmite |
| 400 | Instant | 17 | Boehmite |
| 550 | Instant | 1 | Boehmite |
| 800 | Instant | 1 | Boehmite |
| 950 | Instant | 1 | O Al$_2$O$_3$ & Boehmite |

EXAMPLE 2

This Example illustrates in more detail the transformation of alumina trihydrate to dispersible boehmite. The gibbsite raw material described in Example 1 was also used in this Example. The gibbsite was charged to an oven preheated at 300° C and maintained at 300° C for 17 hours after attaining that temperature. The intermediate product realized from this calcination had a surface area of 295 m$^2$/g and was found to be largely amorphous or poorly crystallized. This intermediate was blended with sufficient water to provide a fluid slurry and charged to an autoclave which was heated at 165° C for 5 hours. A slurry of fine white particles was discharged from the autoclave. A substantial amount of these particles remained in suspension when 0.25% of HCl was added to a portion of the slurry. Another portion of the slurry was dried at 110° C for 15 hours. This product had a loss on ignition of 17.7%; a surface area of 40 m$^2$/g and was found to be highly crystalline boehmite.

EXAMPLE 3

An alumina trihydrate with a smaller particle size was converted to boehmite by the process of this invention. This alumina trihydrate has a surface area of 13.5 m$^2$/g. The material was calcined for 11 hours at 375° C. The intermediate product had a surface area of 537 m$^2$/g and was blended with sufficient water to provide a fluid slurry. The slurry was charged to an autoclave and heated at 185° C for 2 hours. A slurry of fine white particles was discharged from the autoclave. Over 90% of these particles remained in stable dispersion when 0.25% of HCl was added to a portion of the slurry. A second portion of the slurry was dried by heating at 110° C for 14 hours. The loss on ignition was 17.9%; the surface area was 157 m$^2$/g; and X-ray analysis indicated the product to be highly crystalline boehmite alumina. Sufficient of this material was blended with water containing 0.25% HCl to provide a suspension of 25% solids. After colloid milling, a dispersion containing 22.8% solids was realized.

We claim:

1. A process for preparing dispersible, colloidal sized particles of boehmite alumina, said boehmite alumina being characterized by a surface area of 35 to 250 m$^2$/g and dispersibility such that up to 25% by weight boehmite solids can be dispersed in water containing 0.01 to 0.5% HCl, said process comprising the steps of:
   (a) calcining alumina trihydrate with a surface area of 0.2 to 15 m$^2$/g at temperatures between 200° and 800° C for a period of 2 to 17 hours, thereby increasing the surface area of the alumina to 250 to 800 m$^2$/g by partial dehydration;
   (b) forming a slurry of said calcined alumina and water;
   (c) autoclaving the slurry at a temperature between 140° and 200° C for a period of one-half to 6 hours, thereby achieving crystallization and rehydration of the alumina and producing a slurry of colloidal sized particles of boehmite and
   (d) dewatering said slurry.

2. The process of claim 1 wherein the slurry of boehmite particles is dewatered by spray drying, tray drying, or rotary drying.

3. The process of claim 1 wherein the calcining temperature is between 300° and 450° C.

4. A process for preparing dispersible colloidal sized particles of boehmite alumina, comprising the steps of:
   (a) calcining the gibbsite form of alumina trihydrate at a temperature between 200° and 800° C for 2 to 17 hours, thereby increasing the surface area from 0.2 to 15 m$^2$/g to between 250 and 800 m$^2$/g;
   (b) forming an aqueous slurry of said calcined alumina and water;
   (c) autoclaving the slurry at a temperature of about 140° and 200° C for a period of ½ to 6 hours, thereby achieving crystallization and rehydration of the alumina and producing a slurry of dispersible colloidal sized particles of boehmite alumina; and
   (d) dewatering said slurry.

5. The process of claim 4 wherein the slurry of boehmite alumina particles is dewatered by spray drying, tray drying or rotary drying.

6. The process of claim 4 wherein the gibbsite has a particle size of 0.5 to 8.0 microns.

7. The process of claim 6 wherein the particle size is 0.5 to 2.0 microns.

8. The process of claim 4 wherein the calcining temperature is between 300° and 450° C.

* * * * *